United States Patent [19]

Reader

[11] Patent Number: 4,608,035

[45] Date of Patent: Aug. 26, 1986

[54] DRIVE ARRANGEMENT

[76] Inventor: Gordon K. Reader, 49 Hayes Chase, West Wickham, Kent, BR4 0HX, United Kingdom

[21] Appl. No.: 557,462

[22] Filed: Dec. 2, 1983

[51] Int. Cl.[4] ............................................. F16H 7/00
[52] U.S. Cl. .................................... 474/148; 474/152; 280/217
[58] Field of Search ...................... 74/61, 87; 474/150, 474/152, 162, 148; 280/217

[56] References Cited

U.S. PATENT DOCUMENTS

| 445,452 | 1/1891 | Murray | 280/217 |
| 1,995,010 | 3/1935 | Quinn | 280/217 |
| 3,237,965 | 3/1966 | Asano | 280/217 |

FOREIGN PATENT DOCUMENTS

| 765054 | 6/1934 | France | 280/217 |
| 423089 | 1/1935 | United Kingdom | 280/217 |
| 109331 | 12/1939 | United Kingdom | 280/217 |

*Primary Examiner*—James A. Leppink
*Assistant Examiner*—Frank McKenzie
*Attorney, Agent, or Firm*—Millen & White

[57] ABSTRACT

In a drive arrangement particularly for use with the chain drive of a cycle a rotatable mass or member, (3;13;19) is arranged to receive rotational drive from the chain (4). The rotatable mass or member is preferably statically and dynamically unbalanced by weight means (19) and is so driven in relation to the positions of the pedal cranks (5,6) during the rotation thereof by a rider of the cycle that impulses of force are imparted to the chain drive in such manner that the operational forces developed in the chain drive are augmented.

2 Claims, 9 Drawing Figures

DRIVE ARRANGEMENT

BACKGROUND OF THE INVENTION

This invention relates to a drive arrangement for increasing the operational force developed in a drive arrangement as a result of applying a given operational load to the drive.

In particular the present invention relates to cycles and to chain drive arrangements for pedal cycles.

OBJECTS OF THE INVENTION

An object of the invention is to provide a drive arrangement which in the case of cycles is intended to reduce the 'peak' work load of a rider of a cycle fitted with the arrangement of the invention during any one pedal revolution as compared with the work load involved under similar conditions in the absence of the drive arrangement.

A further object of the present invention is through the employment of the drive arrangement of the invention, by effectively extending the effective period during which the work load may be applied to the cycle by the rider, to make it possible for the rider of a cycle equipped with the drive arrangement to obtain a higher degree of performance as may be compared with the degree of performance which may be obtained under similar conditions in the absence of the drive arrangements.

SUMMARIES OF THE INVENTION

According to the invention there is provided an arrangement for augmenting the operational force developed in a drive apparatus such as a cycle drive apparatus, as a result of applying a given operational load to the drive, the arrangement including force producing means connectable to receive operational drive from said apparatus for imparting to the drive a succession of force impulses to augment the operational force developed as a result of said load application.

Conveniently, the impulses are produced by rotating an unbalanced rotatable member at a predetermined rotational speed in relation to the rate of drive of the drive apparatus.

Conveniently, the rotatable member may be a sprocket wheel or the like arrangement engageable with the chain to be rotated thereby, the said sprocket wheel or the like arrangement being heavier to one side of a diametrical plane thereof than to the other side of the same diametrical plane.

If desired, the sprocket wheel or like arrangement may be made lighter to one side of the plane than to the weight of the other side of said plane so as to achieve a similar effect.

BRIEF DESCRIPTION OF THE DRAWINGS

For a better understanding of the invention and to show how the same may be carried into effect reference will now be made to the accompanying drawings in which.

DESCRIPTION OF THE PREFERRED EMBODIMENTS

Figure 1:
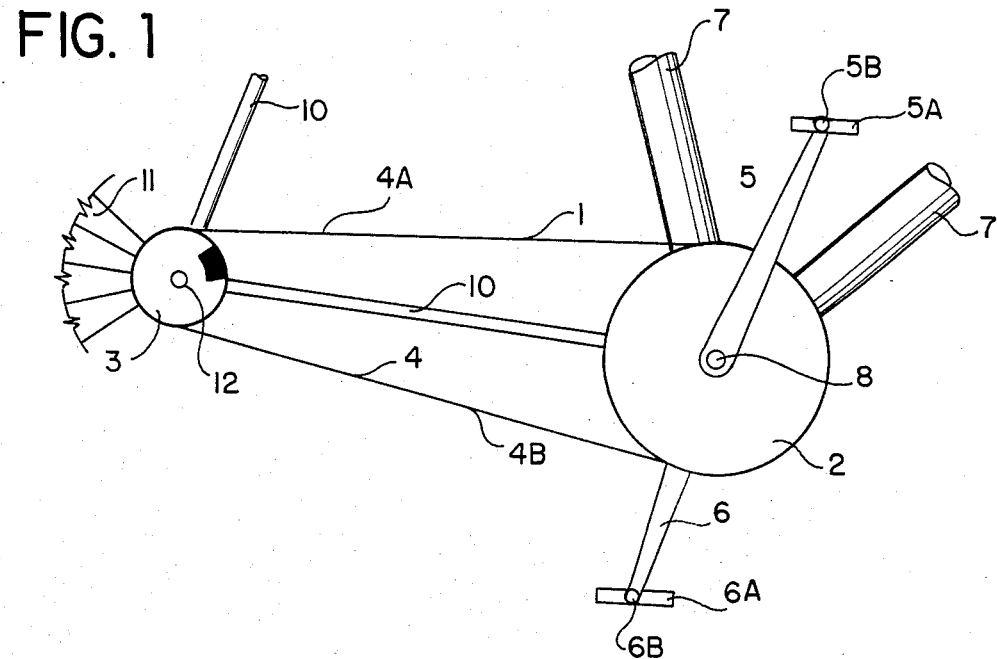
FIG. 1 schematically illustrates a chain drive as used on a cycle, of which only a fragmentary part is shown, incorporating the drive arrangement of the invention.

Referring now to FIG. 1, this shows a cycle chain drive including a chain drive wheel 2, a rear driven sprocket wheel 3, a chain 4 having an upper run 4A and a lower run 4B, a right hand side crank arm 5 and associated pedal 5A mounted upon a pivot 5B and a left hand side crank arm 6 and associated pedal mounted upon a pivot 6B.

The crank arm 6 is constrained to rotate with the chain wheel 2. The chainwheel and the crank arms are pivotally mounted with respect to the frame 7 of the cycle by means of an axle 8. In the Figure only a fragmentary portion of the frame 7 is shown, and only those portions which connect with the chain drive arrangements. Also only fragmentary parts of spokes are used to depict a rear wheel 11. It is believed that the construction of a bicycle is so very well known that a detailed discussion of its construction is not required in the present specification. As so far described it will be noted that the rotation of the sprocket wheel 3 and thus the rear wheel 11 is caused by drive being transmitted from the chain drive wheel 2 by the chain 4. For reasons to be discussed hereinafter the wheel 3 is weightwise unbalanced.

In practice, the relative numbers of teeth on the chain drive wheel 2 and the sprocket wheel 3 define the gear ratio of the drive and thus the relative speeds of the wheels 2 and 3.

The sprocket wheel 3 may be fixed in the sense that it is able to drive the wheel 11 in either direction of rotation of the chain drive wheel 2, or the sprocket wheel may be able to free-wheel on reverse rotation of the chain wheel. Also, in the latter case the sprocket wheel 3 may be associated with some form of multi-speed gear arrangement such as the in-hub form commonly known as a Sturmy-Archer Gear or chain drive transmissions more commonly known as the Derailleur Gear.

Figure 2:
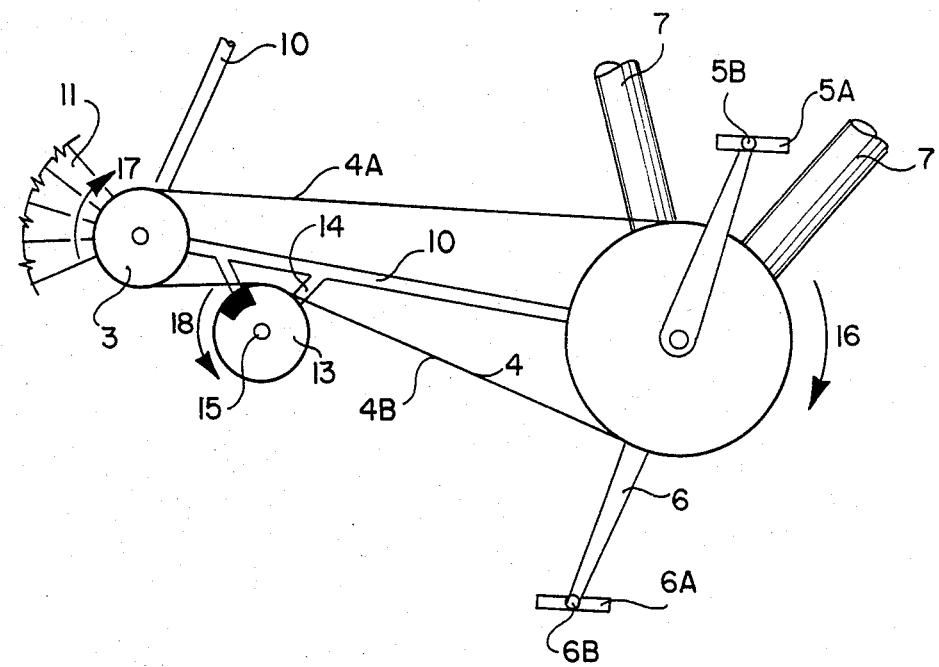
FIG. 2 schematically illustrates a second embodiment of a drive arrangement of the invention, when an alternative location of the drive arrangement may be appropriate on a particular cycle form.

Referring now particularly to FIG. 2, this Figure schematically shows the features of the present invention when associated with the chain drive of FIG. 1.

In accordance with the invention a further sprocket wheel 13 is mounted from the horizontal rails of the frame 7 by means of a support means 14, schematically represented in the FIG. 2, so as to be rotatable about an axis arranged parallel to the axes of rotation of the chain drive wheel 2 and the sprocket wheel 3.

Operationally, the sprocket wheel 13 engages with the lower run 4B of the chain 4, whereby any movement of the chain drive wheel 2 rotates the sprocket wheel 13. In the FIG. 2, the directions of rotation of the wheels 2,3 and 13 are indicated by the arrows 16,17, and 18 respectively.

As will be discussed in detail hereinafter the sprocket wheel 13 is effectively weightwise unbalanced the effect of which will be discussed hereinafter. In addition, the number of teeth on the sprocket wheel 13 is chosen to be one half of the number of teeth provided upon the drive chain wheel 2, whereby the sprocket 13 rotates twice as fast as the rotation rate of the chain drive wheel 2.

In particular, it has been found that if the sprocket wheel 13 rotates twice as fast as the chain wheel 2, and the unbalancing of the sprocket wheel 13 such as to ensure that the weight distribution of the sprocket wheel to one side of a diametrical plane 19 of the sprocket wheel is greater than that to the other side of the plane 19 it is possible to so phase the rotation of the sprocket wheel 13 relative to the chain that the forces arising from the unbalanced condition will augment the drive forces produced in the chain by the pedalling action of the rider.

The preferred phasing or timing of this 'heavy' side of the sprocket wheel 13 with respect to the chain wheel 2 is such that the heavy side of the sprocket wheel 13 is essentially starting its co-operation with the chain linkage of the lower run 4B during that period of the chain wheel rotation at which the pedal crank arm is thirty to fifty degrees beyond its top dead centre position, on in the vicinity thereof, and is thus positioned to be moved further downwards by the rider.

In other words it is believed that the unbalancing of the sprocket wheel 13 has the effect of delivering an impulse of force to the chain run 4B in the direction that tends to drive the chain. That is to say the sprocket wheel 13 effectively exerts a force which assists in the rotation of the chain drive wheel 2 and in so doing reduces the peak pedal force necessary to produce the same, that is required, torque at the point of effective leverage. In practice, because of the two to one rotational speed relationship between the chain wheel 2 and the sprocket wheel 3/13 a 'pull' is exerted by the sprocket wheel 3/13 whenever a crank arm 5 or 6 is moved forwardly downward.

Significantly, according to an aspect of the invention, opposite rotation of the sprocket wheel 13 will not affect the degree of force derived from the said drive-couple so that either direction of rotation may be chosen according to requirements. Conveniently, the sprocket wheel 13 may rotate in either a clockwise or in a counterclockwise direction as may be considered appropriate to particular requirements. In other words according to the direction of movement of the chain 4 at the point of engagement with the sprocket wheel 13, the latter will rotate in a clockwise or counterclockwise direction. Very schematically FIGS. 1 and 2 illustrate respectively examples of both directions or sprocket wheel rotation.

Conveniently, the rotatable unbalanced load may comprise a plate other than a sprocket wheel which is loaded weightwise to one side of an axial plane. The opposite region of the plate can be lightened by forming a series of lightening holes or cavities to produce the desired imbalance.

In any particular unit the order of the imbalance in regard to cycles is likely to remain in the region of 10 to 1.000 grammes.

In practice, it is convenient to locate the sprocket wheel and any associated weight structure within the rails 10 of the frame 7 and also to provide suitable safety guard arrangements (not shown).

It will be understood that the unbalancing weight arrangements need not be located in a sprocket wheel or plate but can be so mounted to the sprocket wheels or wheel itself of a cycle provided that the weight rotates at the same rate as the sprocket wheel and maintains the above mentioned phasing.

Reference will now be made to FIGS. 3 to 7 which very schematically represent states in a cycle of rotation of the chain wheel and the weighted rear sprocket wheel 3/13. In the Figures the two to one relationship is obtained by having 20 teeth on the sprocket 3 and 40 teeth on the chain drive wheel 2.

As mentioned above the unbalancing load could be provided by a suitably loaded plate or weight mounted at a predetermined distance from the axis of rotation of the wheel 3/13. Thus in so far as FIGS. 3 to 7 are concerned the ring 13 may conveniently be regarded as indicating the path of the weight 19 irrespective of its particular physical construction.

Figure 3:
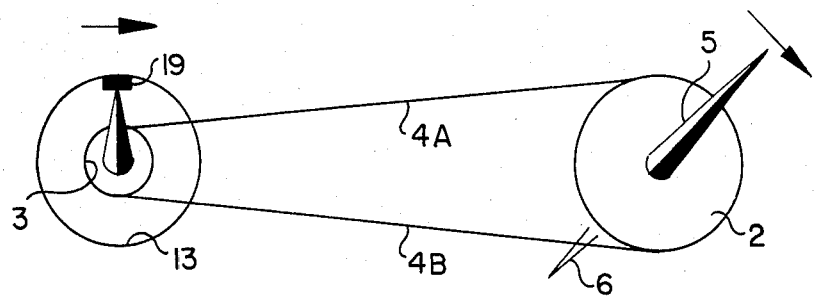
FIGS. 3 to 7 schematically represent successive states in a cycle of rotation of a cycle chainwheel, rear sprocket, and pedal drive arrangement.

Referring now to FIG. 3 from a practical aspect, the position of the main driving crank 5 can conveniently be regarded as the position assumed by the rider at the start of using the cycle drive. From the two to one relationship employed it will be realised that for a given rotation of 45° of the chain drive wheel 2, the associated sprocket wheel 3 will rotate through 90°. Thus, from the illustrated position, driving the crank downwardly through 45° will rotate the associated sprocket wheel 3, and its associated weight 19 through 90° of rotation. It will be noted that the preferred phasing or timing of the sprocket wheel weight 19 in relation to the main crank 5 is such that upon the crank 5 reaching its point of effective maximum leverage, the sprocket and weight 19 will have rotated to a position in which the line joining the centre of the weight with the axis of of rotation is horizontal. Whilst, in practice, the true position of the point of maximum effective crank arm leverage will vary from cycle to cycle according to saddle position, height etc., for illustration purposes the 90° position is deemed to represent for the crank the position of maximum effective leverage, and for the weight the location of maximum torque exerted upon the chain whilst the right hand crank is moving downwardly.

Figure 4:
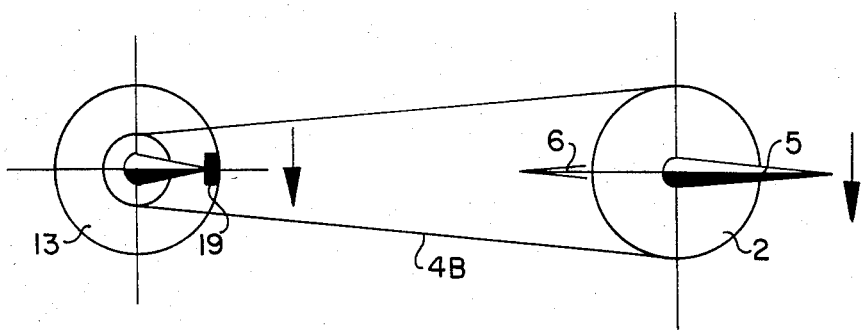

Referring now to FIG. 4, from this FIG. 4 it will be noted that the torque is supplied by the action of the phased weight rotating downwardly through the 90° point in its circle of rotation significantly increases that produced by the user at the position of maximum effective leverage. This augmentation is simply a matter of mechanical routine and occurs each time a crank arm passes the 90° position, i.e. pulse like.

As the cycle proceeds in reaction to the force applied to the pedals, effectively increasing the turning force which can be applied effectively to a cycle crank increases directly the cycle performance to which it relates.

In other words, the cycle responds exactly to the torque value raised in accordance with Newton's Third Law of Motion, that action and reaction are both equal and opposite.

Figure 5:
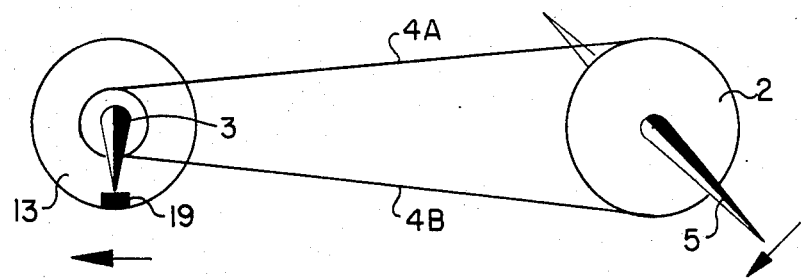

Referring now to FIG. 5, from this Figure it will be seen that the further action of the weight together with the pressure applied by the user to the right hand crank maintains the higher torque value raised during the continued reaction to the position shewn. The vertically downwards direction of kinetic energy changes with rotation to the horizontally rearwards direction, so that in practical terms, the inertia of the weight continues to exert a 'pull' upon the lower run of the chain.

Figure 6:
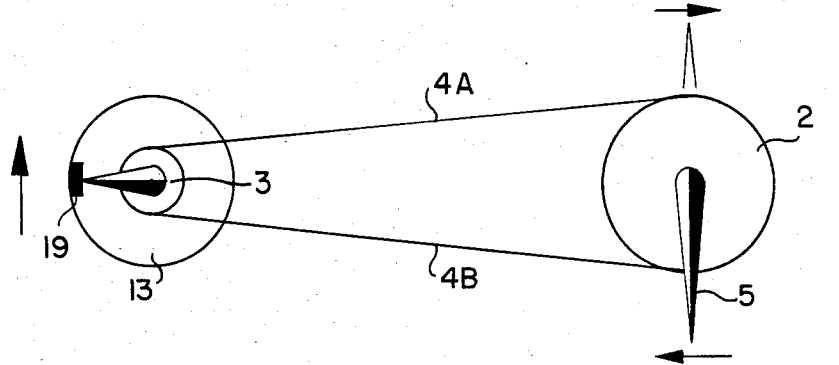

Referring now to FIG. 6 it will be seen from this Figure that the weight has moved rearward of the axis of the rear sprocket. The kinetic energy force is acting vertically upwards whilst the mass of the weight will be acting vertically downwards, thereby reducing but not negating the overall energy content of the rotating weight.

Figure 7:
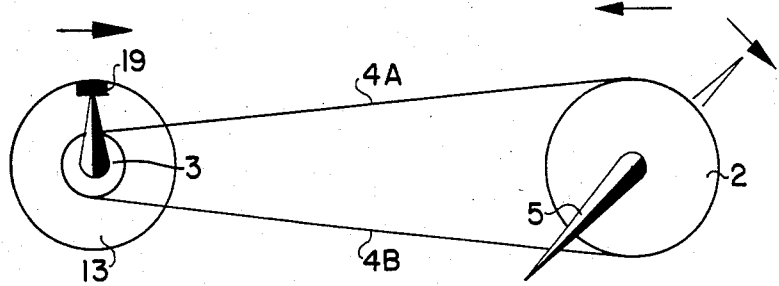
Figure 8:
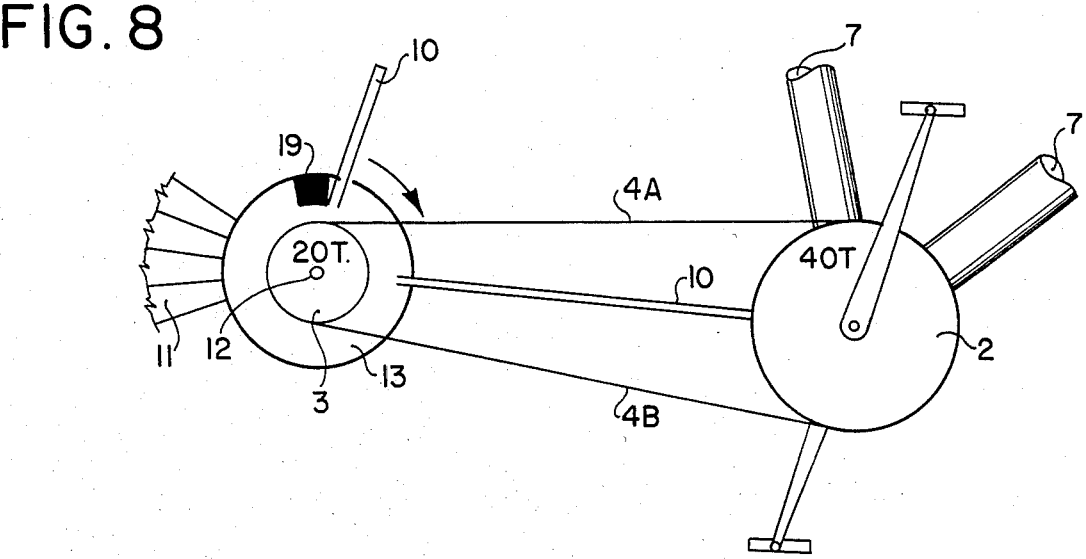
FIG. 8 schematically illustrates the application of the arrangement of the invention to simple or fixed speed chain drives and chain drives incorporating multi-speed arrangements that are mounted within the hub of a cycle wheel.

Referring now to FIG. 7 from which it will be seen that the weight has returned to its uppermost position whereby the weight has totally renewed its potential energy, whilst at the same time the left hand crank assumes the 45° position previously assumed by the right hand crank as depicted by FIG. 3.

From the forgoing descriptions it will be clear that when the drive arrangement of the invention is static, that is to say when the weight is at rest, for example at the bottom dead centre (BDC) position as shown in FIG. 5, that work must be done to raise the weight from BDC to Top Dead Centre (TDC) as shown in FIG. 7.

During this period as may be seen from FIGS. 5,6 and 7 the crank arm 5 passes through BDC and the crank arm 6 has passed through TDC. In other words, work additional to that which can be achieved on a bicycle not equipped with the drive arrangement of the invention is done during the period which may be conveniently described as the pedal cross-over period. When the weight 19 passes through the TDC position the potential energy thus accumulated is released i.e., starts to decrease, and thereby assists in the pedal downward push which immediately follows the passage through TDC. This downpush phase being illustrated in FIGS. 3,4 and 5 from which it is clear that the weight is acting downwardly. The practical effect upon 'everyday' cycling speeds being to reduce the level of the 'peak' force required to produce the same level of torque. Furthermore if it is appreciated that the force built up during the period of pedal cross-over in no way affects the normal downpush available from the rider it will be realised that the power available to drive the cycle may be continuously uprated thereby raising the performance of the cycle to beyond that attainable from an identical cycle not equipped with the drive arrangement of the invention and in which the drive effort applied by the rider is limited to the 30° to 140° arc of pedal rotation.

It will be noted that whilst the forgoing discussion has been related to a simple single speed chain drive, it has been found that the provision of a multi-speed drive such as a Sturmey Archer type of 'hub' multi-speed drive does not prevent a sprocket wheel 13 from producing said 'pull'. In this connection it will be noted that whilst the effective rear wheel sprocket teeth number changes with a change of gear ratio the relationship between the sprocket wheel 13 and the chain drive wheel 2 remains unchanged.

Significantly, where the ratio of teeth on the main chain drive wheel 2 to the number of teeth on the rear wheel sprocket 3 approximates to two to one, the latter may be substituted by the sprocket wheel 13 operating in lieu thereof together with its associated weight 19, the location about the axle 12 being most suitable for simple single or fixed speed cycles in addition to multi-speed transmissions of the Sturmey Archer 'hub' type. Significantly, the two to one ratio between the chain drive wheel 2 and the sprocket wheel 3/13, that is the weight unbalance 19, must remain in order to maintain the set phasing of the drive-couple relative to the pedal crank.

Figure 9:
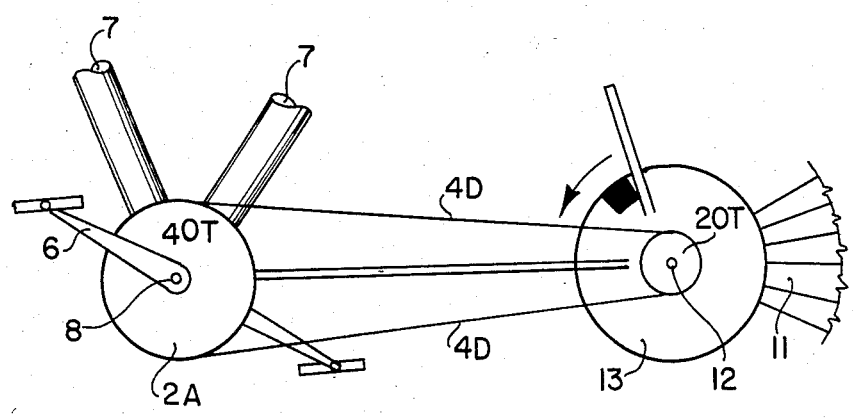
FIG. 9 schematically represents the drive arrangement of the invention when installed on the left hand side of a cycle as may be required for some operational purposes.

In the case of multi-speed arrangements which involve the actual derailing of the chain 4 from one sprocket wheel to another according to the number of driven teeth required to be used, reference will now be made to FIG. 9, in which the arrangements of the invention may be regarded as being viewed from the left hand side of the cycle. FIG. 9 schematically shews the features of the present invention when associated with the chain drive of FIG. 1 and to cycles employing multi-speed drives of all types, but particularly with reference to multi-speed drives of the Derailleur type.

It is important to note that the FIG. 9 illustrates the cycle as seen from the left hand side and illustrates a chain wheel 2A and a chain 4D which are additional to the main chain wheel and chain drive carried on the right hand side of the cycle in the normal way. As may be seen from the illustration the chain 4D connects the chain wheel 2A to the sprocket wheel 13 which is located about the rear axle 12 being mounted between the rear wheel, shewn by the fragmentary spokes 11 and the left hand side rails 10 of the frame 7.

It is not thought necessary to discuss the general principles of operation as these have already been discussed herein, but to merely illustrate a method of application to cycles utilising chain transmissions of the Derailleur type and to bicycles in general.

In reviewing the methods of connecting the assembly which provides the drive couple, by means of which additional torque is made available to a main drive member such as a chain wheel and associated crank it will be noted that the above discussions have been centered around chain drives and particularly to chain drives of cycles. It will however be understood that the principles of the invention may be applied to other forms of drive such as, for example, shaft drives, gear drives, epicyclic gear drives and belt drives or the like into which may be introduced the feature of an unbalanced rotatable member as above discussed.

It will be appreciated that the rotational movement of the weight in the accumulation of the potential energy and its subsequent release as above mentioned in effect produces impulses of force which augment the operational force developed by the rider as compared with the force developed in the absence of the rotatable member and under otherwise similar riding conditions.

What I claim is:

1. An arrangement for augmenting the operating force developed in a bicycle chain drive system incorporating a pedal crank drive wheel rotatable about a first axis with respect to the frame of the cycle and having pedal supporting drive cranks mounted to the crank wheel as to be oppositely directed to each other and rotatable with the cranks, a driven chain wheel rotatable about a second axis parallel to the first axis and having a two to one gearing ratio relative to the drive wheel, an unbalanced weight mounted for rotation with the driven chain wheel and having an axis which is parallel with the second axis whereby the unbalanced weight has a rotational rate twice that of the drive wheel for imparting a succession of force impulses to the chain drive which act in such manner as to so augment the operating forces developed in the chain as a result of said forces being applied to the cranks, in such manner that the augmenting force transmitted to the crank wheel is the same for each pedal.

2. An arrangement as claimed in claim 1, and in which the driven chain wheel is itself weightwise unbalanced whereby the unbalanced weight means is effectively incorporated in the driven chain wheel.

* * * * *